(12) United States Patent
Salkintzis et al.

(10) Patent No.: US 10,785,820 B2
(45) Date of Patent: Sep. 22, 2020

(54) MULTI-ACCESS DATA CONNECTION IN A MOBILE NETWORK

(71) Applicant: Motorola Mobility LLC, Chicago, IL (US)

(72) Inventors: Apostolis Salkintzis, Athens (GR); Dimitrios Karampatsis, Ruislip (GB)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/348,470

(22) PCT Filed: Jul. 10, 2017

(86) PCT No.: PCT/EP2017/067227
§ 371 (c)(1),
(2) Date: May 8, 2019

(87) PCT Pub. No.: WO2019/011398
PCT Pub. Date: Jan. 17, 2019

(65) Prior Publication Data
US 2019/0274178 A1 Sep. 5, 2019

(51) Int. Cl.
*H04W 76/15* (2018.01)
*H04W 40/12* (2009.01)
*H04W 88/06* (2009.01)

(52) U.S. Cl.
CPC ........... *H04W 76/15* (2018.02); *H04W 40/12* (2013.01); *H04W 88/06* (2013.01)

(58) Field of Classification Search
CPC .................................................. H04W 76/15
See application file for complete search history.

(56) References Cited

U.S. PATENT DOCUMENTS

| 9,386,478 B2 * | 7/2016 | Hong ................ H04W 28/0289 |
| 2008/0188223 A1 * | 8/2008 | Vesterinen ............ H04W 36/02 455/436 |

(Continued)

FOREIGN PATENT DOCUMENTS

WO 2015/126999 A1 8/2015

OTHER PUBLICATIONS

Patent Cooperation Treaty, "International Search Report", PCT/EP2017/067227, dated Mar. 21, 2018, pp. 1-4.

(Continued)

*Primary Examiner* — Hsinchun Liao
(74) *Attorney, Agent, or Firm* — Kunzler Bean & Adamson

(57) ABSTRACT

Apparatuses, methods, and systems are disclosed for establishing data paths over multiple access network for a multi-access data connection. One apparatus includes a processor and a transceiver that communicates with one or more network functions in a mobile communication network. The processor receives a first session management request via an AMF. Here, the first session management request contains a second session management request sent by a remote unit that communicates with the mobile communication network over a first access network and a second access network, second session management request being sent over the second access network. The processor 405 sends a first request to the access management function to establish a first data path for a multi-access data connection over the first access network and sends a second request to the access management function to establish a second data path for the multi-access data connection over the second access network. Here, both the first data path and the second data path are anchored at a common user plane network function in the mobile communication network.

14 Claims, 12 Drawing Sheets

(56) References Cited

U.S. PATENT DOCUMENTS

2011/0103303 A1\* 5/2011 Hsu ...................... H04W 76/12
370/328
2013/0016696 A1 1/2013 Adjakple et al.

OTHER PUBLICATIONS

Patent Cooperation Treaty, "Written Opinion of the International Searching Authority", PCT/EP2017/067227, dated Mar. 21, 2018, pp. 1-7.
3GPP, "3rd Generation Partnership Project; Technical Specification Group Services and System Aspects; Network-Based IP Based IP Flow Mobility (NBIFORM); Stage 2 (Release 13)", 3GPP TS 23.161 V13.5.0, Dec. 2016, pp. 1-67.
3GPP "3rd Generation Partnership Project; Technical Specification Group Services and System Aspects; Procedures for the 5G System; Stage 2 (Release 15)", 3GPP TS 23.502 V0.5.0, Jul. 2017, pp. 1-148.
Motorola Mobility, Lenovo, "Establishment of MA-PDU Sessions", SA WG2 Meeting #125 S2-180273, Jan. 22-26, 2018, pp. 1-3.
3GPP, "3rd Generation Partnership Project; Technical Specification Group Services and System Aspects; Study on Architecture for Next Generation System (Release 14)", 3GPP TS 23.799 V14.0.0, Dec. 2016, pp. 1-260.
3GPP, "3rd Generation Partnership Project; Technical Specification Group Services and System Aspects; System Architecture for the 5G System; Stage 2 (Release 15)", 3GPP TS 23.501 V1.1.0, Jul. 2017, pp. 1-165.

\* cited by examiner

MULTI-ACCESS DATA CONNECTION IN A MOBILE NETWORK

FIELD

The subject matter disclosed herein relates generally to wireless communications and more particularly relates to establishing data paths over multiple access network for a multi-access data connection.

BACKGROUND

The following abbreviations and acronyms are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Channel State Information ("CSI"), Common Search Space ("CSS"), Discrete Fourier Transform Spread ("DFT-S"), Downlink Control Information ("DCI"), Discrete Fourier Transform Spread OFDM ("DFT-S-OFDM"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Negative-Acknowledgment ("NACK") or ("NAK"), Network Function ("NF"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Switching/Splitting Function ("SSF"), Scheduling Request ("SR"), Session Management Function ("SMF"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, the core network is to support Multi-Access PDU (MA-PDU) sessions between 3GPP access networks (including LTE, evolved LTE, and New Radio) and non-3GPP (typically WLAN) access networks. A MA-PDU session refers to a data session composed of two (and, rarely, of more) PDU sessions that share the same attributes (e.g., the same S-NSSAI, same SSC mode, same DNN, same type, same address/prefix, etc.), but are established over different types of access networks (e.g., over a 3GPP AN and a WLAN). These PDU sessions established over different types of access networks are terminated at same UPF anchor (UPF-A).

However, establishing a MA-PDU session currently requires two separate UE-requested PDU sessions. First, an initial PDU session over one access is established and then an additional PDU over a different access is also established. The additional PDU session becomes "linked" with the initial PDU session because it was established to the same APN and also because it contains an Network-Based IP Flow Mobility ("NBIFOM") indication.

BRIEF SUMMARY

Methods for establishing a multi-access data connection are disclosed. Apparatuses and systems also perform the functions of the methods. In some embodiments, a method of a session management function for establishing a multi-access data connection includes receiving a first session management request via an access management function in a mobile communication network. Here, the first session management request contains a second session management request sent by a remote unit in communication with the mobile communication network over a first access network and a second access network. The method includes sending a first request to the access management function to establish a first data path for the multi-access data connection over the first access network, in response to the first session management request. The method includes sending a second request to the access management function to establish a second data path for the multi-access data connection over the second access network, wherein both the first data path and the second data path are anchored at a common user plane network function in the mobile communication network, in response to the first session management request. In one embodiment, the second session management request is sent over the second access network.

In certain embodiments, a method of a UE for establishing a multi-access data connection includes communicating with a mobile communication network over both a first access network and a second access network and transmitting a request, over the second access network, to establish a data connection. The method includes receiving a first request to set up a first data bearer for the data connection over the first access network in response to the request and receiving a second request to set up a second data bearer for the data connection over the second access network in response to the request, wherein both the first data bearer and the second data bearer are used to carry traffic of the data connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
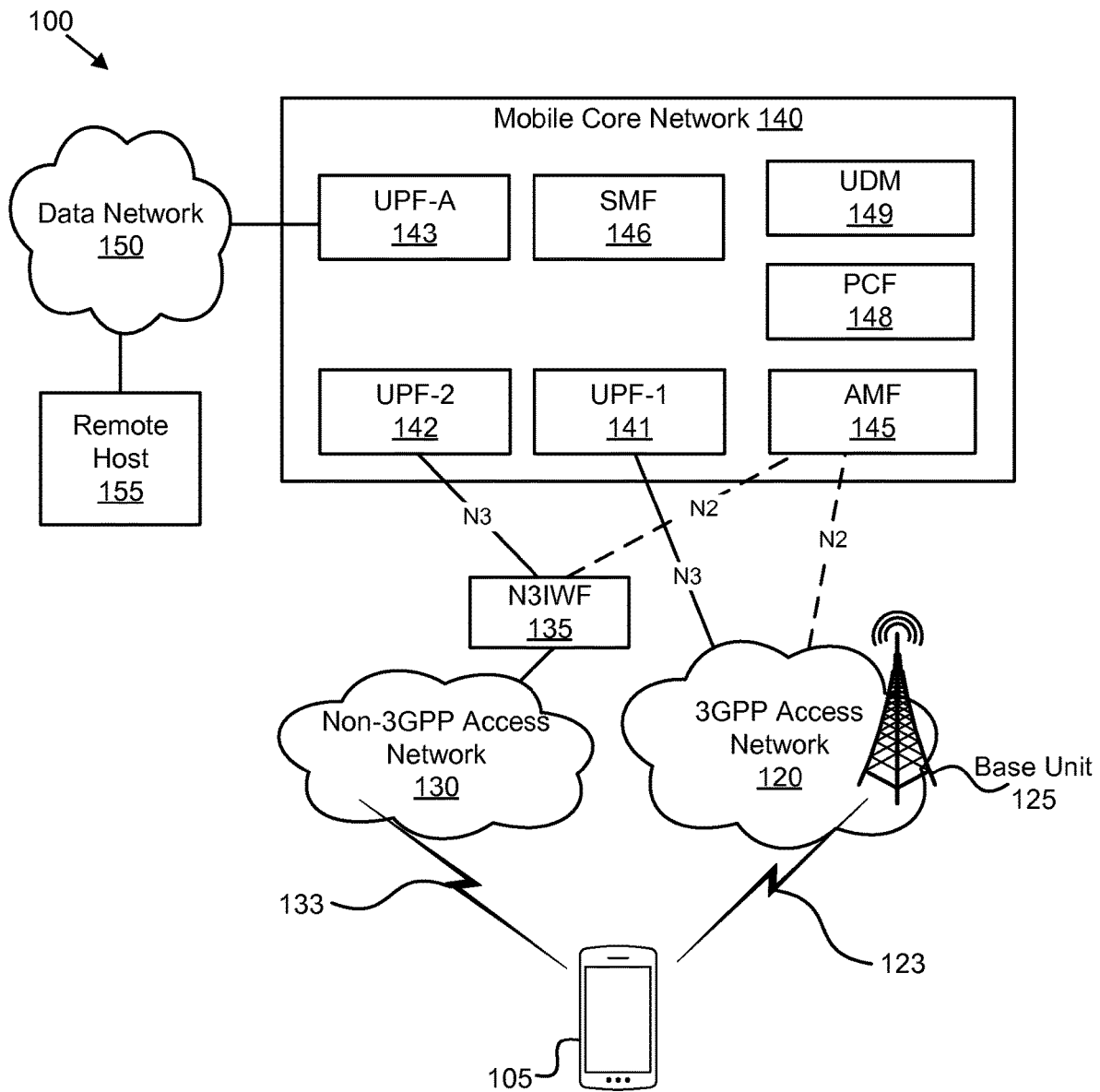
FIG. 1 is a schematic block diagram illustrating one embodiment of a wireless communication system for establishing a multi-access data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed to allow a UE to establish a Multi-Access PDU (MA-PDU) session, or other multi-access data connection, by sending a single Session Management (SM) request message towards the mobile communication network. As described herein, the establishment of a multi-access data connection may be UE initiated or network initiated. Although a MA-PDU session is commonly used as an example to describe the establishment of the multi-access data connection, other types of multi-access data connection may be established using the disclosed methods, apparatuses, systems, and procedures.

FIG. 1 depicts a wireless communication system 100 for establishing a multi-access data connection, according to embodiments of the disclosure. In one embodiment, the wireless communication system 100 includes at least one remote unit 105, a 3GPP access network 120 containing at least one cellular base unit 125, a non-3GPP access network 130, 3GPP communication links 123, non-3GPP access communication links 133, and a mobile core network 140. Even though a specific number of remote units 105, 3GPP access networks 120, base units 125, 3GPP communication links 123, non-3GPP access networks 130, non-3GPP communication links 133, and mobile core networks 140 are depicted in FIG. 1, one of skill in the art will recognize that any number of remote units 105, 3GPP access networks 120, base units 125, 3GPP communication links 123, non-3GPP access networks 130, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 125 via uplink ("UL") and downlink ("DL") communication signals. Furthermore, the UL and DL communication signals may be carried over the 3GPP communication links 123. Similarly, the remote units 105 may communicate with one or more non-3GPP access networks 130 via UL and DL communication signals carried over the non-3GPP communication links 133.

In some embodiments, the remote units 105 communicate with a remote host 155 via a network connection with the mobile core network 140. For example, a remote unit 105 may establish a PDU connection (or other data connection) with the mobile core network 140 using a 3GPP access network 120 and/or a non-3GPP access network 130. The mobile core network 140 then relays traffic between the remote unit 105 and the remote host 155 using the PDU connection. In other embodiments, the remote unit 105 may communicate with the remote host 155 over the non-3GPP access network 130 without traffic passing through the mobile core network 140. This is referred to as direct offloading.

The base units 125 may be distributed over a geographic region. In certain embodiments, a base unit 125 may also be referred to as an access terminal, a base, a base station, a Node-B, an eNB, a gNB, a Home Node-B, a relay node, a device, or by any other terminology used in the art. The base units 125 are generally part of a radio access network ("RAN"), such as the 3GPP access network 120, that may include one or more controllers communicably coupled to one or more corresponding base units 125. These and other elements of radio access network are not illustrated but are well known generally by those having ordinary skill in the art. The base units 125 connect to the mobile core network 140 via the 3GPP access network 120.

The base units 125 may serve a number of remote units 105 within a serving area, for example, a cell or a cell sector via a wireless communication link. The base units 125 may communicate directly with one or more of the remote units 105 via communication signals. Generally, the base units 125 transmit downlink ("DL") communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the base units 125.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a base unit 125. The non-3GPP access networks 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. A non-3GPP access network 130 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via a non-3GPP interworking function ("N3IWF") 135. The N3IWF 135 provides interworking between a non-3GPP AN 120 and the mobile core network 140, supporting connectivity via the "N2" and "N3" interfaces. As depicted, both the 3GPP access network 120 and the N3IWF 135 communicate with the AMF 145 using a "N2" interface and with the UPFs 141, 142 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. While the N3IWF 135 is depicted as being located outside both the non-3GPP access network 130 and the core network 140, in other embodiments the N3IWF 135 may be co-located with the non-3GPP access network 130 (e.g., if the non-3GPP access network 130 is a trusted non-3GPP access network) or located within the core network 140.

In one embodiment, the mobile core network 140 is a 5G core ("5GC") or the evolved packet core ("EPC"), which may be coupled to another data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes a first UPF 141 that serves a 3GPP access network 120, a second UPF 142 that serves a non-3GPP access network 130, and an anchor UPF ("UPF-A") 143. The mobile core network 140 also includes multiple control plane functions including, but not limited to, an Access and Mobility Management Function ("AMF") 145, a Session Management Function ("SMF") 146, a Policy Control Function ("PCF") 148, and a Unified Data Management function ("UDM") 149. Although specific numbers and types of network functions are depicted in FIG. 1, one of skill in the art will recognize that any number and type of network functions may be included in the mobile core network 140.

As depicted, a remote unit 105 may be connected to both a base unit 125 in a 3GPP access network 120 and a base unit (not shown in FIG. 1) in a non-3GPP access network 130. The remote unit 105 may transmit a request to establish a data connection over one of the 3GPP access network 120 and the non-3GPP access network 130. In some embodiments, the request includes an indication that a multi-access data connection is to be established (e.g., a UE-initiated multi-access data connection). For example, the remote unit 105 may indicate that a multi-access data connection is to be established by including a first session identifier (e.g., associated with the 3GPP access network 120) and a second session identifier (e.g., associated with the non-3GPP access network 130) in the establishment request. As another example, the remote unit 105 may indicate that a multi-access data connection is to be established by including a session identifier and a multi-access parameter in the request. In other embodiments, the request does not include an indication that a multi-access data connection is to be established (i.e. it is a request for a single-access data connection) but the SMF 146 receiving the request determines to create a multi-access data connection (e.g., a network-initiated multi-access data connection).

After receiving the request to establish a data connection, the SMF 146 initiates the multi-access data connection by triggering the establishment of a data path (e.g., a child PDU session) over the non-3GPP access network 130 and triggering the establishment of another data path (e.g., another child PDU session) over the 3GPP access network 120. For example, the SMF 146 may trigger the establishment of a data path by sending a session management ("SM") request to the AMF 145, as described below with reference to FIGS. 5-7. Note that the multi-access data connection is anchored at a common UPF (e.g., the UPF-A 143).

Figure 2:
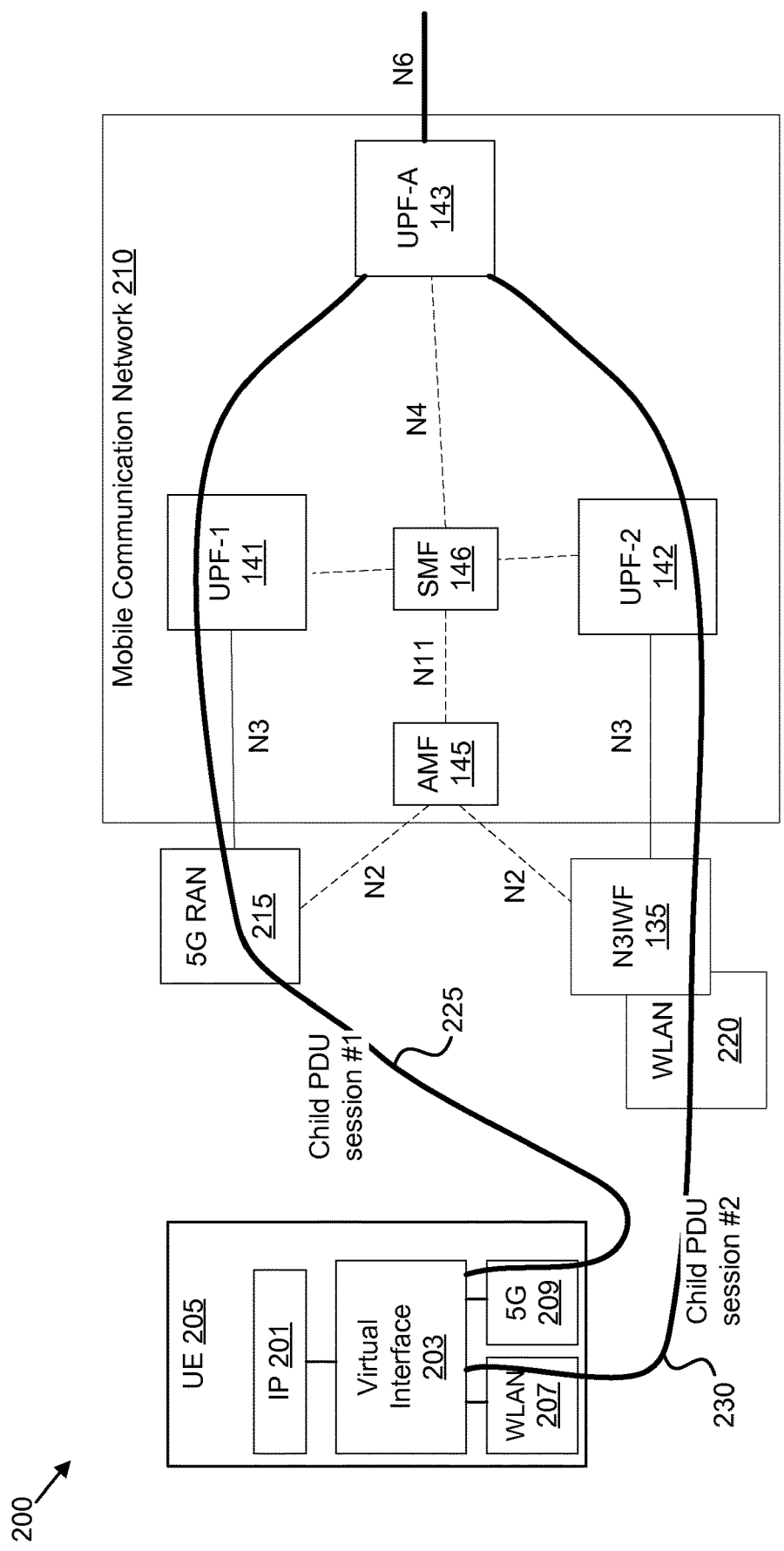
FIG. 2 is a block diagram illustrating one embodiment of a network architecture for establishing a multi-access data connection.

FIG. 2 depicts a network architecture 200 used for establishing a multi-access data connection, according to embodiments of the disclosure. The network architecture 200 may be a simplified embodiment of the wireless communication system 100. As depicted, the network architecture 200 includes a UE 205 that communicates with mobile communication network 210 over both a 5G RAN 215 and a WLAN 220, such as a Wi-Fi RAN. The 5G RAN 215 is one embodiment of the 3GPP access network 120 and the WLAN 220 is one embodiment of the non-3GPP access network 130, described above. The mobile communication network 210 is one embodiment of the core network 140, described above, and includes a first UPF 141, a second UPF 142, an anchor UPF 143, an AMF 145, and a SMF 146. The WLAN 220 accesses the mobile communication network via the N3IWF 135, which may be co-located with the WLAN 220, located in the mobile core network, or located outside both the WLAN 220 and the mobile core network, as described above. The N3IWF 135 communicates with the AMF 145 via an "N2" interface and with the second UPF 142 via an "N3" interface. The 5G RAN 215 communicates with the AMF 145 via an "N2" interface and with the first UPF 141 via an "N3" interface.

As depicted, the UE 205 includes a protocol stack containing an IP layer 201, a virtual interface layer 203, a WLAN interface 207, and a 5G radio interface 209. After sending the single request to establish a data connection (e.g., a MA-PDU session), as described herein, the UE 205 receives a request to set up a first data bearer for the data connection (corresponding to the first child PDU session 225) over the 5G RAN 215 and a request to set up a second data bearer for the data connection (corresponding to the second child PDU session 230) over the WLAN 220. The requests include one or more session identifiers included in the single request so that the UE 205 knows they are both for the same MA-PDU session.

Accordingly, the UE 205 establishes a multi-access data connection (here depicted as a MA-PDU session) that has two child PDU sessions: a first child PDU session 225 that utilizes the 5G radio interface 209 and the 5G RAN 215 and a second child PDU session 230 that utilizes the WLAN interface 207 and the WLAN 220 (e.g. a public Wi-Fi hotspot). The two child PDU sessions are linked in the UE in the "virtual interface" layer 203 which exposes a single IP interface to upper layers (e.g., the IP layer 201). Accordingly, the two child PDU sessions share the same IP address and compose a multi-link data connection between the UE 205 and the UPF-A 143. FIG. 2 shows a scenario with three UPFs: the first UPF 141 interfacing to 5G RAN 215, the second UPF 142 interfacing with N3IWF 135, and the anchor UPF 143. However, in other scenarios the UPFs 141, 142 may not be required, for example where it is possible to interface the anchor UPF 143 directly to the 5G RAN 215 and to the N3IWF 135.

Figure 3:
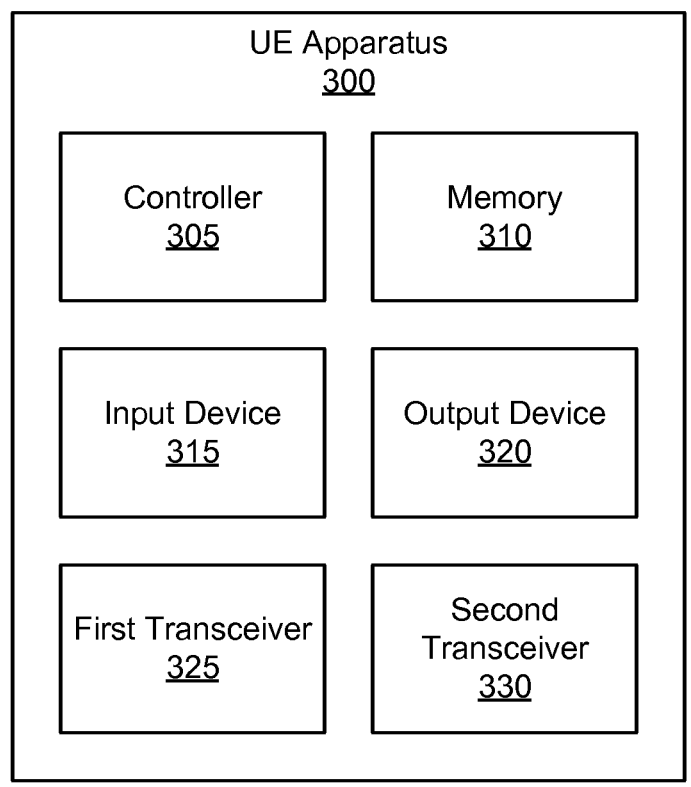
FIG. 3 is a schematic block diagram illustrating one embodiment of a UE apparatus for establishing a multi-access data connection.

FIG. 3 depicts one embodiment of a UE apparatus 300 that may be used for establishing a multi-access data connection, according to embodiments of the disclosure. The UE apparatus 300 may be one embodiment of the remote unit 105. Furthermore, the UE apparatus 300 may include a processor 305, a memory 310, an input device 315, a display 320, a first transceiver 325, and a second transceiver 330.

The first transceiver 325 communicates with a mobile communication network (e.g., the mobile core network 140) over a first access network, while the second transceiver 330 communicates with the mobile communication network over a second access network. The first and second access networks facilitate communication between the mobile core network 140 and the UE apparatus 300. In one embodiment, the first access network is the 5G RAN 215 or other 3GPP access network 120 and the second access network is the WLAN 220 or other non-3GPP access network 130. In another embodiment, the second access network is the 5G RAN 215 or other 3GPP access network 120 and the first access network is the WLAN 220 or other non-3GPP access network 130. In other embodiments, the first access network and second access network may be other types of access networks, the first access network being a different type of access network than the second. Each transceiver 325, 330 may include at least one transmitter and at least one receiver. Additionally, the transceivers 325, 330 may support at least one network interface such as an "Uu" interface used for communications between the remote unit 105 and the 3GPP access network 120.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, the first transceiver 325, and the second transceiver 330.

In some embodiments, the processor 305 transmits a request to establish a data connection. In certain embodiments, the request to establish a data connection comprises an indication to establish the data connection over both the first and the second access networks. In one embodiment, the indication to establish the data connection over both the first and the second access networks comprises a first session identifier associated with the first access network and a second session identifier associated with the second access network. In another embodiment, the indication to establish the data connection over both the first and the second access networks comprises a first session identifier and a multi-access parameter. Here, the first session identifier is associated to both the first access network and the second access network.

In some embodiments, the processor 305 transmits the request to establish a data connection over the second access network. Additionally, the request to establish a data connection contains a session identifier associated with the second access network and does not contain a session identifier associated with the first access network. In certain embodiments, the request to establish a data connection comprises a mode parameter, the mode parameter containing a requested mode of operation for a multi-access data connection.

In certain embodiments, the first access network is an access network not defined by 3GPP ("non-3GPP access") and the second access network is an access network defined by 3GPP ("3GPP access"). In such embodiments, the request to establish a data connection may be a Packet Data Unit ("PDU") session request.

The processor 305 receives a first request to set up a first data bearer for the data connection over the first access network in response to the request also receives a second request to set up a second data bearer for the data connection over the second access network in response to the request. Here, both the first data bearer and the second data bearer are used to carry the traffic of the data connection.

In certain embodiments, the request to establish a data connection contains a session identifier associated with the second access network and does not contain an indication to establish the data connection over both the first and the second access networks. Further, the first request to set up a first data bearer for the data connection over the first access network and the second request to set up a second data bearer for the data connection over the second access network both include the session identifier associated with the second access network. In such embodiments, the processor 305 determines that the request over the second access network to establish a data connection has initiated the establishment of a multi-access data connection over the first access network and the second access network.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to establishing a multi-access data connection, for example storing session identifiers, protocol stacks, security keys, messages, and the like. In some embodiments, the memory 310 also stores program code and related data, such as an operating system or other controller algorithms operating on the UE apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315. In certain embodiments, the UE apparatus 300 may not include any input device 315 and/or display 320.

As discussed above, the first transceiver 325 communicates with a mobile communication network via a first access network, while the second transceiver 330 communicates with the mobile communication network via a second access network. The transceivers 325 and 330 operate under the control of the processor 305 to transmit messages, data, and other signals and also to receive messages, data, and other signals. For example, the processor 305 may selectively activate one or both of the transceivers 325, 330 (or portions thereof) at particular times in order to send and receive messages. The first transceiver 325 may include one or more transmitters and one or more receivers for communicating over the first access network. Similarly, the second transceiver 330 may include one or more transmitters and one or more receivers for communicating over the second access network. As discussed above, the first transceiver 325 and the second transceiver 330 may support one or more the network interfaces for communicating with the mobile communication network. In certain embodiments, the first transceiver 325 and second transceiver 330 may be combined into a single transceiver unit, for example a single chip performing functions of the first transceiver 325 and second transceiver 330. In certain embodiments, the first transceiver 325 and second transceiver 330 may share one or more hardware components.

Figure 4:
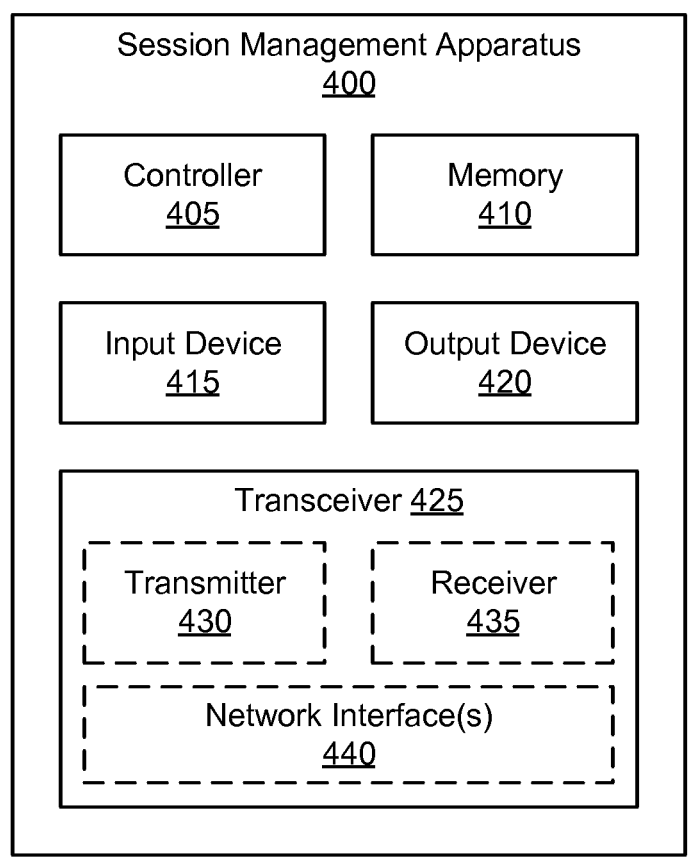
FIG. 4 is a schematic block diagram illustrating one embodiment of a session management apparatus for establishing a multi-access data connection.

FIG. 4 depicts one embodiment of a session management apparatus 400 that may be used for establishing a multi-access data connection, according to embodiments of the disclosure. The session management apparatus 400 may be one embodiment of the SMF 146. Furthermore, the session management apparatus 400 may include a processor 405, a memory 410, an input device 415, a display 420, and a transceiver 425. In some embodiments, the input device 415 and the display 420 are combined into a single device, such as a touchscreen. In certain embodiments, the session management apparatus 400 may not include any input device 415 and/or display 420.

As depicted, the transceiver 425 includes at least one transmitter 430 and at least one receiver 435. Additionally, the transceiver 425 may support at least one network interface 440 such as an "Na" interface used for communications between a UE and the session management apparatus 400. Here, the network interface 440 facilitates communication with a network function such as the AMF 145, PCF 148 and/or UDM 149. Additionally, the at least one network interface 440 may include an "N11" interface used for communications with an AMF, an "N4" interface used for communication with an UDM, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 receives a first session management ("SM") request via an access management function. Here, the first SM request contains a second SM request sent by a remote unit (e.g., the second SM request being embedded in the first SM request). The remote unit communicates with the mobile communication network over a first access network and a second access network and has simultaneous connections over both access networks. In one embodiment, the remote unit sends the second SM message over the first access network. In another embodiment, the remote unit sends the second SM message over the second access network. In one embodiment, the second SM message includes a mode parameter, the mode parameter containing a requested mode of operation for a multi-access data connection.

In response to the first session management request, the processor 405 sends a first request to the access management function to establish a first data path for a multi-access data connection over the first access network. In some embodiments, the processor 405 determines to form the multi-access data connection based on the contents of the first SM request. For example, the first SM request may include a multi-access parameter or a specific request for a multi-access data connection. As another example, the processor 405 may determine to form the multi-access data connection in response to a need to offload data traffic to a non-3GPP access network.

The processor 405 also sends a second request to the access management function to establish a second data path for the multi-access data connection over the second access network, in response to the first session management request, wherein both the first data path and the second data path are anchored at a common user plane network function in the mobile communication network. In some embodiments, establishment of the first and second data paths may occur simultaneously.

Where establishment is sequential, the first established data path (in time) is determined based on the access network used by the remote unit to send the second SM request. For example, where the second SM message is sent over the first access network, then the second data path over the second access network will be established prior to the first data path. As another example, where the second SM message is sent over the second access network, then the first data path over the first access network will be established prior to the second data path.

In some embodiments, the first session management request (e.g., received from the AMF) contains an indication to establish a multi-access data connection for the remote unit over both a first access network and a second access network. For example, indication to establish a multi-access data connection for the remote unit over both a first access network and a second access network may be a first session identifier associated with the first access network and a second session identifier associated with the second access network. As another example, the indication to establish a multi-access data connection for the remote unit over both a first access network and a second access network may be a multi-access parameter included with a (single) session identifier.

In certain embodiments, the processor 405 queries a policy control function for at least one of multi-access routing rules and multi-access QoS rules associated with the remote unit. Here, the multi-access QoS rules comprise QoS rules for the first access network and QoS rules for the second access network. The multi-access routing rules indicate how to route the traffic of the multi-access data connection across the first access network and the second access network. Additionally, the processor 405 may send a session establishment request to the common user plane function anchoring the first and second data paths, the session establishment request including the multi-access routing rules and an indication that the first and second data paths are for a multi-access data connection.

In some embodiments, the second session management request is a request from the remote unit to establish a data connection over a single access network. Additionally, the first session management request may include an indication that the remote unit has simultaneous connections to both the first access network and the second access network. In such embodiments, the processor 405 may determine to establish a multi-access data connection in response to receiving the first session management request (and the indication that the remote unit has simultaneous connections to both the first access network and the second access network).

In certain embodiments, the processor 405 further queries a data management function (e.g., the UDM 149) to determine whether a network subscription of the remote unit allows a multi-access connection in response to receiving the first session management request. In such embodiments, the processor 405 may determine to establish a multi-access data connection based on the network subscription of the remote unit. In certain embodiments, the processor 405 further queries a policy control function (e.g., the PCF 148) for at least one of multi-access routing rules and multi-access QoS rules associated with the requested data connection in response to receiving the first session management request, and wherein the processor determines to establish the multi-access data connection based on the at least one of multi-access routing rules and multi-access QoS rules received from the policy control function.

In some embodiments, the first access network is a non-3GPP access network (e.g., an access network not defined by 3GPP) and the second access network is a 3GPP network (e.g., an access network defined by 3GPP). Further, the second SM request (e.g., sent by the remote unit) may be a PDU session establishment request. In such embodiment, the sending the first request to the AMF to establish the first data path for the multi-access data connection may include the processor 405 sending a third SM request to the AMF without an embedded N1 Session Management container, the third SM request indicating that the AMF is to send it to the first access network.

Additionally, sending the second request to the AMF to establish the second data path for the multi-access data connection may include the processor 405 sending a response to the first SM request, wherein the response contains an embedded N1 Session Management container. Here, the embedded N1 Session Management container includes a response to the second SM message. Accordingly, the embedded N1 Session Management container is sent over the same access network used by the remote unit to send the second SM message. In one embodiment, the N1 Session Management container includes a PDU session establishment access message that contains multi-access routing rules and multi-access quality-of-service ("QoS") rules associated with the multi-access data connection.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to establishing a multi-access data connection, for example storing session identifiers associated with a remote unit, protocol stacks, messages, security keys, multi-access policy rules, and the like. In certain embodiments, the memory 410 also stores program code and related data, such as an operating system or other controller algorithms operating on the session management apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the base unit 125.

FIG. 5 depicts a network procedure 500 for establishing a multi-access data connection, according to embodiments of the disclosure. The network procedure 500 is a UE-initiated procedure for establishing a multi-access data connection from a single UE request to establish a data connection. The network procedure involves the UE 205, the 5G RAN 215, the N3IWF 135, the AMF 145, the SMF 146, the first UPF 141, the second UPF 142, the anchor UPF 143, and the PCF 148. Here, the UE 205 is simultaneously connected to the mobile communication network via a 3GPP access network (here, the 5G RAN 215) and a non-3GPP access network (such as the WLAN 220).

Figure 5A:
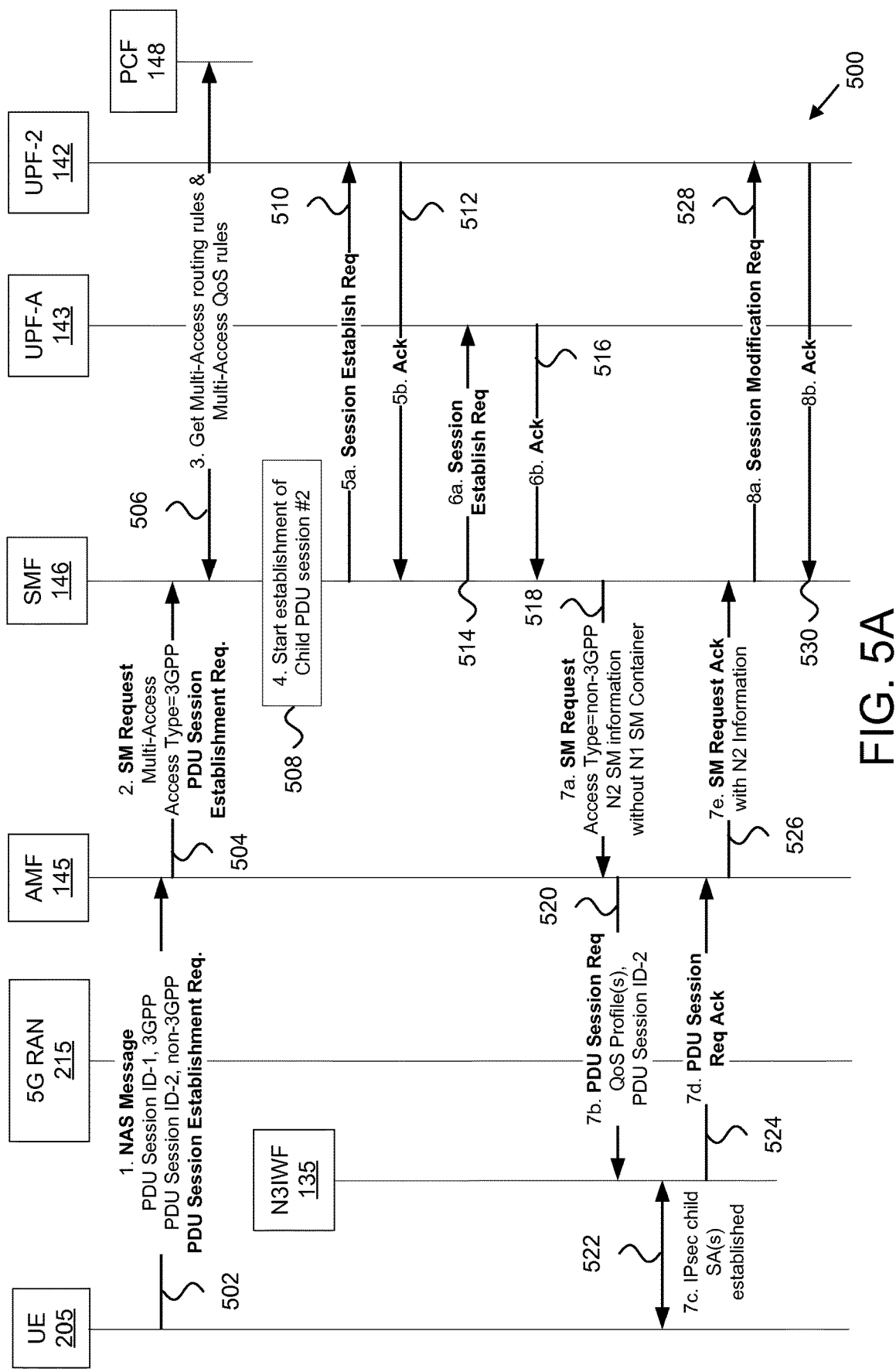
FIG. 5A is a block diagram illustrating one embodiment of a network procedure for establishing a multi-access data connection.

The network procedure 500 begins as the UE 205 wants to establish a MA-PDU session over both access networks and sends a NAS message to AMF 145 which includes a "PDU Session Establishment Request" (see operation 502). In the embodiments of FIG. 5A, the NAS message is sent over the 5G RAN 215 (e.g., the 3GPP access network), but in other embodiments the NAS message may be sent over the non-3GPP access network. The NAS message includes also two PDU session identities: a first PDU session identity (ID-1) associated with the 3GPP access network (e.g., including the 5G RAN 215) and a second PDU session identity (ID-2) associated with the non-3GPP access network. This is in contrast to conventional NAS messages sent for PDU session establishment which always contain only one PDU session identity.

In certain embodiments, the UE 205 indicates that it wants to establish a MA-PDU over both the 3GPP and non-3GPP access networks by including within the NAS message the two PDU session identities. The NAS message sent by the UE 205 may also include other information, such as the requested DNN (Data Network Name), the requested slice type, etc. In some embodiments, the "PDU Session Establishment Request" message may include a mode parameter that indicates the requested mode of operation of the MA-PDU session. For example, the mode parameter may indicate that the UE 205 prefers the MA-PDU session to operate in active/standby mode, with the child PDU session over non-3GPP access network to be the "active" child and the child PDU session over the 3GPP access network to be the "standby" child. As another example, the UE 205 may prefer the child PDU session over the 3GPP access network to be the "active" child and the child PDU session over the non-3GPP access network to be the "standby" child.

In active/standby mode, all traffic of the MA-PDU session is transferred over the "active" child PDU session while the other child PDU session (the "standby" child) does not carry any traffic. When the "active" child PDU session becomes unavailable in the UE 205 (e.g. due to lack of radio signal), it becomes the "standby" child and the UE 205 transfers all traffic of the MA-PDU session to the other child PDU session which becomes the "active" child. When the network receives traffic from the UE 205 over a "standby" child PDU session, it changes this child PDU session to "active." When the MA-PDU session operates in active/standby mode there is no need to apply any multi-access routing rules (discussed below).

Next, the AMF 145 selects an SMF 146 and sends a SM Request (e.g., a first SM request) to the SMF 146 (see operation 504). The SM Request includes the "PDU Session Establishment Request" received from the UE 205. The SM Request further includes an Access Network Type parameter. Here, this parameter has the value "Access network Type=3GPP" to indicate to the SMF 146 that the PDU Session Establishment Request was received over 3GPP access network (e.g., the 5G RAN 215). Where the PDU Session Establishment Request is received over the non-3GPP access network, then a value "Access network Type=non-3GPP" is to be used. In addition, the SM Request includes the two PDU session identities provided by the UE 205 which further indicate that the UE 205 wants to establish a MA-PDU session. In certain embodiments, the SM Request further includes a multi-access parameter to indicate whether a multi-access data connection (here a MA-PDU) is to be established. Note that the multi-access parameter is redundant when the UE 205 provides two PDU session identities.

The SMF 146 selects a PCF (here PCF 148) and establishes a new session with the selected PCF 148, as normally (see operation 506). Subsequently, the SMF 146 retrieves from the PCF 148 multi-access routing rules that should be applied at the UE 205 and at the UPF-A 143 in order to determine how to route uplink and downlink traffic respectively across the two child PDU sessions. These multi-access routing rules are also known as "traffic steering rules." As used herein, traffic steering rules refer to rules provided to the remote units 105 by the mobile core network 103. Traffic steering rules are used by the UE 205 for access selection when initiating a new data flow. As an example, multi-access routing rule may indicate "select child PDU session #2 for app-x" or "select child PDU session #2 for non-IMS traffic between 9 am and 5 pm." As another example, a multi-access routing rule may steer HTTP traffic to child PDU session #2 and voice-over-IP traffic to child PDU session #1.

The SMF 146 may also retrieve from the PCF 148 multi-access QoS rules. Multi-access QoS rules include QoS rules that should be applied over the 5G RAN 215 (e.g., the 3GPP access network) and QoS rules that should be applied over non-3GPP access network. The purpose of the QoS rules applied over one access network is to enable traffic on this access network to be transported with different QoS characteristics, e.g. different priority, different guaranteed bit rate, etc.

After communicating with the PCF 148, the SMF 146 begins the establishment of the user-plane for the child PDU session which utilizes non-3GPP access network (see operation 508). Here, the SMF 146 sends a Session Establishment Request (see operation 510) to the second UPF 142 (serving the N3IWF 135) and receives an acknowledgement in response (see operation 512). The SMF 146 also sends a Session Establishment Request (see operation 514) to the anchor UPF 143 and receives an acknowledgement in response (see operation 516).

Next, the SMF 146 sends an SM Request to the AMF 145 (see operation 518) with a new parameter "Access network type=non-3GPP" to indicate to the AMF 145 that the included N2 SM Information should be sent to the non-3GPP access network (and not to the 3GPP access network where the "PDU Session Establishment Request" was received from). Note that this SM Request message does not contain a NAS message for the UE 205 (there is no N1 SM Container). This is because the SM Request message is not a response to the AMF's earlier SM request (e.g., the UE-initiated request), but it is rather a new SM Request initiated by the SMF 146.

The AMF 145 sends the N2 SM Information, i.e. a PDU Session Request message, to the N3IWF 135 (see operation 520). The PDU Session Request message includes the QoS profile(s) to be applied over non-3GPP access network, each one determined from the QoS rules to be applied over the non-3GPP access network, provided by the PCF 148 in operation 506. Also, the N3IWF 135 receives the PDU Session ID-2 that was provided by the UE 205 in operation 502 and was associated with the non-3GPP access network.

In response, the N3IWF 135 establishes one or more IPsec child Security Associations (SAs) with the UE 205 (see operation 522). Each IPsec SA carries one or multiple QoS flows for the child PDU session established over the non-3GPP access network (e.g., the second child PDU session 230). Each QoS flow is associated with a QoS profile received by the N3IWF 135 in the PDU Session Request message. The N3IWF 135 then sends a PDU Session Request Acknowledgment message to the AMF 145 (see operation 524) and the AMF 145 sends a SM Request Acknowledgment message to the SMF 146 (see operation 526). The SMF 146 also sends a Session Modification Request to the second UPF 142 (see operation 528) and receives an Acknowledgment message in response (see operation 530).

Figure 5B:
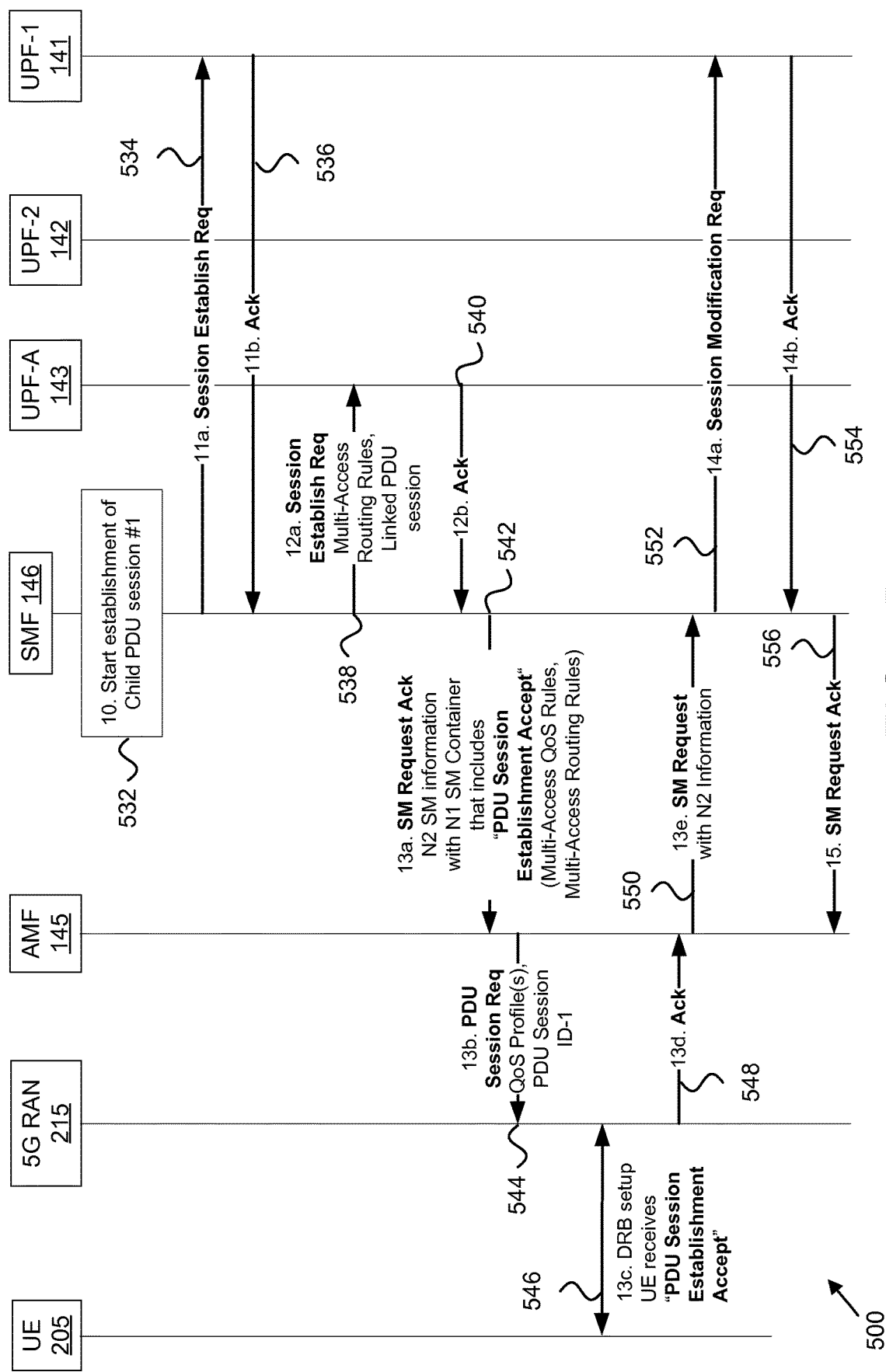
FIG. 5B is a continuation of the network procedure of FIG. 5A.

Continuing at FIG. 5B, the SMF 146 begins the establishment of the user-plane for the child PDU session over 3GPP (e.g., the first child PDU session 225), which utilizes 3GPP access network (see operation 532). Here, the SMF 146 sends a Session Establishment Request (see operation 534) to the first UPF 141 (serving the 5G RAN 215) and receives an acknowledgement in response (see operation 536).

The SMF 146 also sends a second Session Establishment Request to the anchor UPF 143 (see operation 538) and receives a second acknowledgement in response (see operation 540). With the second Session Establishment Request, the SMF 146 provides the multi-access routing rules to the anchor UPF 143 (see operation 538). As discussed above, the anchor UPF 143 uses the multi-access routing rules to determine how to route downlink traffic across the two child PDU sessions. The SMF 146 also provides a "Linked PDU session" parameter that informs the anchor UPF 143 to associate the new PDU session with the PDU session established before (e.g., in operation 514). This parameter indicates that the anchor UPF 143 should consider the identified PDU sessions as child PDU sessions of the same MA-PDU session and apply the multi-access routing rules to route downlink traffic across these child PDU sessions.

Figure 8:
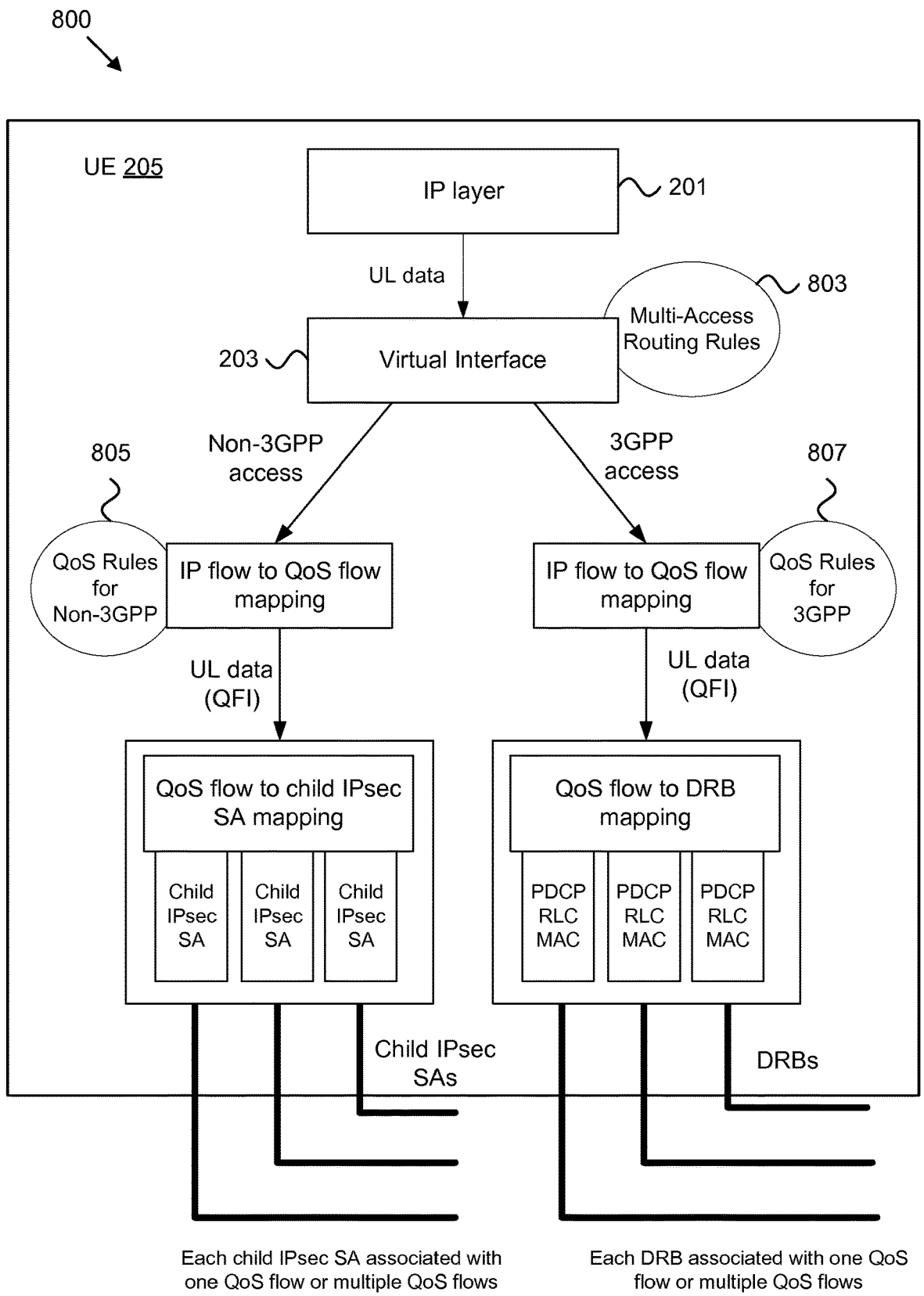
FIG. 8 is a block diagram illustrating one embodiment of a UE with a multi-access data connection.

Next, the SMF 146 sends an SM Request Acknowledgment message to the AMF 145 (see operation 542) to respond to the SM Request in operation 504. The SM Request Acknowledgment message includes N2 SM information for the 5G RAN 215 and an N1 SM Container that includes a "PDU Session Establishment Accept" message. Here, the "PDU Session Establishment Accept" message contains (a) the multi-access QoS rules and (b) the multi-access routing rules to be applied by the UE 205. FIG. 8 illustrates how these rules are applied in the UE 205.

Returning to FIG. 5B, the "PDU Session Establishment Accept" message is the response to the "PDU Session Establishment Request" message sent by the UE 205 in operation 502. In certain embodiments, the "PDU Session Establishment Accept" message may include a mode parameter that indicates the negotiated mode of operation of the MA-PDU session. This mode may be the same as or different from the mode requested by the UE 205. For example, the UE 205 may request active/standby mode with the "active" child being the child PDU session over the non-3GPP access network, but the network may decide to change the "active" child to the child PDU session over the 3GPP access network.

The AMF 145 sends the N2 SM Information, i.e. a PDU Session Request message, to the 5G RAN 215 (see operation 544). The PDU Session Request message includes the QoS profile(s) to be applied over the 5G RAN 215 (e.g., the 3GPP access network), each profile determined from the QoS rules to be applied over the 3GPP access network, as provided by the PCF 148 in operation 506. Also, the 5G RAN 215 receives the PDU Session ID-1 that was provided by the UE 205 in operation 502 and was associated with the 3GPP access network.

In response, the 5G RAN 215 sends a "PDU session Establishment Accept" message to the UE 205. Also, the 5G RAN 215 and UE 205 establish one or more Data Radio Bearers (DRBs), each DRB associated with one or multiple QoS rules (e.g., for transferring the traffic matching these QoS rules). Each DRB carries one or multiple QoS flows for the child PDU session over the 3GPP access network (e.g., the first child PDU session 225). Each QoS flow is associated with a QoS profile sent to the 5G RAN 215.

The 5G RAN 215 then sends an Acknowledgment message to the AMF 145 (see operation 548) and the AMF 145 sends a SM Request message with N2 information to the SMF 146 (see operation 550). The SMF 146 then sends a Session Modification Request to the first UPF 141 (see operation 552) and receives an Acknowledgment message in response (see operation 554). The SMF 146 procedure sends a SM Request Acknowledgment message to the AMF 145 and the network procedure 500 ends.

Note that the DRBs established over the 3GPP access network (e.g., the 5G RAN 215) serve the same purpose of the child IPsec SAs established over non-3GPP access network: they both provide multiple communication bearers with different QoS characteristics. Also, while FIG. 5 shows sequential establishment of the child PDU sessions, in other embodiments the two child PDU session are established in parallel.

FIG. 6 depicts a network procedure 600 for establishing a multi-access data connection from a single UE 205 request, according to embodiments of the disclosure. The network procedure 600 is also a UE 205-initiated procedure and shares many similarities with the network procedure 500. The network procedure 600 involves the UE 205, the 5G RAN 215, the N3IWF 135, the AMF 145, the SMF 146, the first UPF 141, the second UPF 142, the anchor UPF 143, and the PCF 148. Again, the UE 205 is simultaneously connected to the mobile communication network via a 3GPP access network (here, the 5G RAN 215) and a non-3GPP access network (such as the WLAN 220).

Figure 6A:
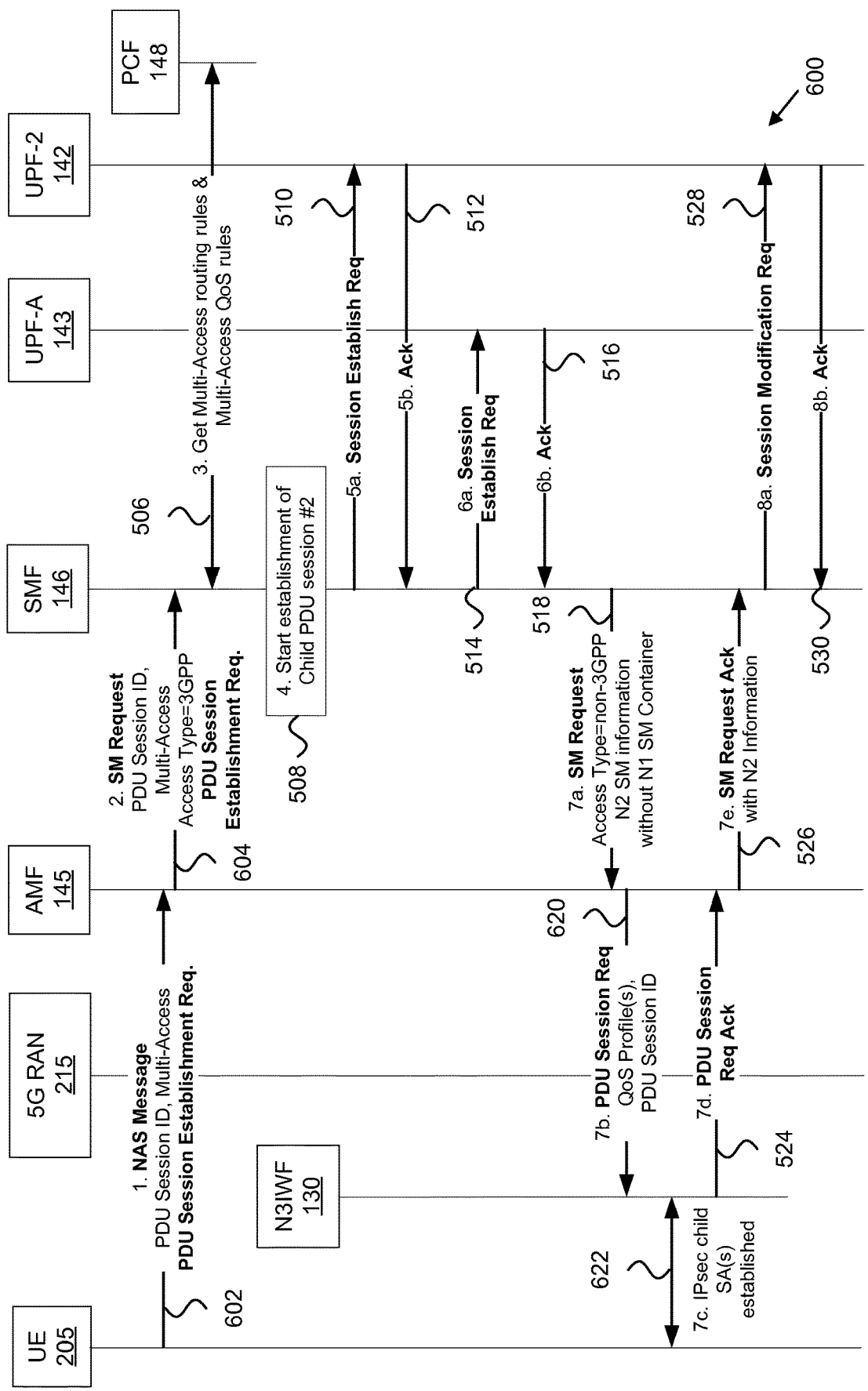
FIG. 6A is a block diagram illustrating one embodiment of a network procedure for establishing a multi-access data connection.

The network procedure 600 begins as the UE 205 wants to establish a MA-PDU session over both access networks and sends a NAS message to AMF 145 which includes a "PDU Session Establishment Request" (see operation 602). In the embodiments of FIG. 6A, the NAS message is sent over the 5G RAN 215 (e.g., the 3GPP access network), but in other embodiments the NAS message may be sent over the non-3GPP access network. The NAS message includes a single PDU session identity and a Multi-access parameter which indicates that the UE 205 wants to establish a multi-access PDU session. This is in contrast to conventional NAS messages sent for PDU session establishment which lacks a Multi-access parameter.

The NAS message sent by the UE 205 may also include other information, such as the requested DNN (Data Network Name), the requested slice type, etc. In some embodiments, the "PDU Session Establishment Request" message may include a mode parameter that indicates the requested mode of operation of the MA-PDU session. For example, the mode parameter may indicate that the UE 205 prefers the MA-PDU session to operate in active/standby mode, with the child PDU session over non-3GPP access network to be the "active" child and the child PDU session over the 5G RAN 215 to be the "standby" child. As another example, the UE 205 may prefer the child PDU session over the 5G RAN 215 to be the "active" child and the child PDU session over the non-3GPP access network to be the "standby" child.

In active/standby mode, all traffic of the MA-PDU session is transferred over the "active" child PDU session while the other child PDU session (the "standby" child) does not carry any traffic. When the "active" child PDU session becomes unavailable in the UE 205 (e.g. due to lack of radio signal), it becomes the "standby" child and the UE 205 transfers all traffic of the MA-PDU session to the other child PDU session which becomes the "active" child. When the network receives traffic from the UE 205 over a "standby" child PDU session, it changes this child PDU session to "active." When the MA-PDU session operates in active/standby mode there is no need to apply any multi-access routing rules (discussed below).

Next, the AMF 145 selects an SMF 146 and sends a SM Request (e.g., a first SM request) to the SMF 146 (see operation 604). The SM Request includes the "PDU Session Establishment Request" received from the UE 205. The SM Request further includes an Access Network Type parameter. Here, this parameter has the value "Access network Type=3GPP" to indicate to the SMF 146 that the PDU Session Establishment Request was received over 3GPP access network (e.g., the 5G RAN 215). Where the PDU Session Establishment Request is received over the non-3GPP access network, then a value "Access network Type=non-3GPP" is to be used.

In addition, the SM Request includes the PDU session identity and the Multi-access indicator provided by the UE 205. Note that in the network procedure 600 the same PDU session ID is used for both access networks. In certain embodiments, the SM Request further includes a multi-access parameter to indicate to the SMF 146 whether a multi-access data connection (here a MA-PDU) is to be established.

The SMF 146 selects and retrieves from the PCF 148 multi-access routing rules and multi-access QoS rules, as described in operation 506. The SMF 146 also begins the establishment of the user-plane for the child PDU session which utilizes non-3GPP access network (see operation 508), sends a Session Establishment Request (see operation 510) to the second UPF 142 (serving the N3IWF 135) and receives an acknowledgement in response (see operation 512). The SMF 146 also sends a Session Establishment Request (see operation 514) to the anchor UPF 143 and receives an acknowledgement in response (see operation 516).

Next, the SMF 146 sends an SM Request to the AMF 145 (see operation 518) with a new parameter "Access network type=non-3GPP" to indicate to the AMF 145 that the included N2 SM Information should be sent to the non-3GPP access network (and not to the 3GPP access network where the NAS "PDU Session Establishment Request" was received from). Again, this SM Request message does not contain a NAS message for the UE 205 (there is no N1 SM Container) as it is not a response to the AMF's earlier SM request.

The AMF 145 sends the N2 SM Information as a PDU Session Request message to the N3IWF 135 (see operation 620). The PDU Session Request message includes the QoS profile(s) to be applied over non-3GPP access network, each one determined from the QoS rules to be applied over the non-3GPP access network, provided by the PCF 148 in operation 506. Also, the N3IWF 135 receives the single PDU Session ID that was provided by the UE 205 in operation 602.

In response, the N3IWF 135 establishes one or more IPsec child Security Associations (SAs) with the UE 205 (see operation 622). Each IPsec SA carries one or multiple QoS flows for the child PDU session established over the non-3GPP access network (e.g., the second child PDU session 230). The N3IWF 135 then sends a PDU Session Request Acknowledgment message to the AMF 145 (see operation 524) and the AMF 145 sends a SM Request Acknowledgment message to the SMF 146 (see operation 526). The SMF 146 also sends a Session Modification Request to the second UPF 142 (see operation 528) and receives an Acknowledgment message in response (see operation 530).

Figure 6B:
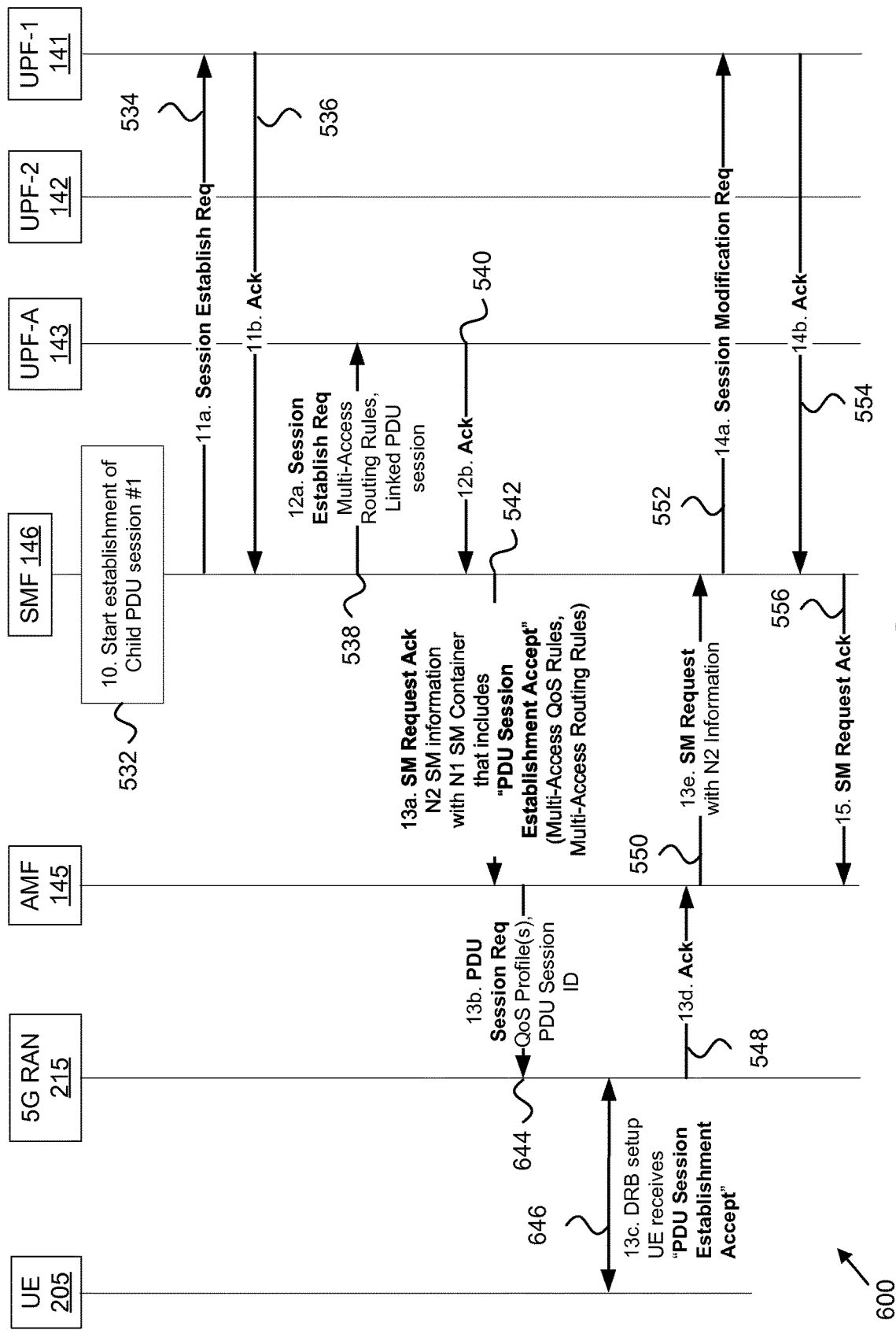
FIG. 6B is a continuation of the network procedure of FIG. 6A.

Continuing at FIG. 6B, the SMF 146 begins the establishment of the user-plane for the child PDU session over 3GPP (e.g., the first child PDU session 225), which utilizes 3GPP access network (see operation 532). Here, the SMF 146 sends a Session Establishment Request (see operation 534) to the first UPF 141 (serving the 5G RAN 215) and receives an acknowledgement in response (see operation 536). The SMF 146 also sends a second Session Establishment Request to the anchor UPF 143 (see operation 538) and receives a second acknowledgement in response (see operation 540).

Next, the SMF 146 sends an SM Request Acknowledgment message to the AMF 145 (see operation 542) to respond to the SM Request in operation 504. The SM Request Acknowledgment message includes N2 SM information for the 5G RAN 215 and an N1 SM Container that includes a NAS "PDU Session Establishment Accept" message. Here, the NAS "PDU Session Establishment Accept" message contains (a) the multi-access QoS rules and (b) the multi-access routing rules to be applied by the UE 205. In certain embodiments, the "PDU Session Establishment Accept" message may include a mode parameter that indicates the negotiated mode of operation of the MA-PDU session. This mode may be the same as or different from the mode requested by the UE 205. For example, the UE 205 may request active/standby mode with the "active" child being the child PDU session over the non-3GPP access network, but the network may decide to change the "active" child to the child PDU session over the 3GPP access network.

The AMF 145 sends the N2 SM Information as a PDU Session Request message to the 5G RAN 215 (see operation 644). The PDU Session Request message includes the QoS profile(s) to be applied over the 5G RAN 215 (e.g., the 3GPP access network), each profile determined from the QoS rules to be applied over the 3GPP access network, as provided by the PCF 148 in operation 506. Also, the 5G RAN 215 receives the single PDU Session ID that was provided by the UE 205.

In response, the 5G RAN 215 sends a NAS "PDU session Establishment Accept" message to the UE 205. Also, the 5G RAN 215 and UE 205 establish one or more Data Radio Bearers (DRBs), each DRB associated with one or multiple QoS rules (e.g., for transferring the traffic matching these QoS rules). Each DRB carries one or multiple QoS flows for the child PDU session over the 3GPP access network (e.g., the first child PDU session 225). Each QoS flow is associated with a QoS profile sent to the 5G RAN 215.

The 5G RAN 215 then sends an Acknowledgment message to the AMF 145 (see operation 548) and the AMF 145 sends a SM Request message with N2 information to the SMF 146 (see operation 550). The SMF 146 then send a Session Modification Request to the first UPF 141 (see operation 552) and receives an Acknowledgment message in response (see operation 554). The SMF 146 procedure sends a SM Request Acknowledgment message to the AMF 145 and the network procedure 600 ends.

Note that the DRBs established over the 3GPP access network (e.g., the 5G RAN 215) serve the same purpose of the child IPsec SAs established over non-3GPP access network: they both provide multiple communication bearers with different QoS characteristics. While FIGS. 6A-B show sequential establishment of the child PDU sessions, in other embodiments the two child PDU session are established in parallel. Also note that because a single PDU session identity is shared by the child PDU sessions, whenever the UE 205 or the network wants to perform an operation on a child PDU session (e.g. the change the QoS rules of the child PDU session #2), both the PDU session identity and the corresponding access network type are to be provided in order to identify the appropriate child PDU session.

Figure 7:
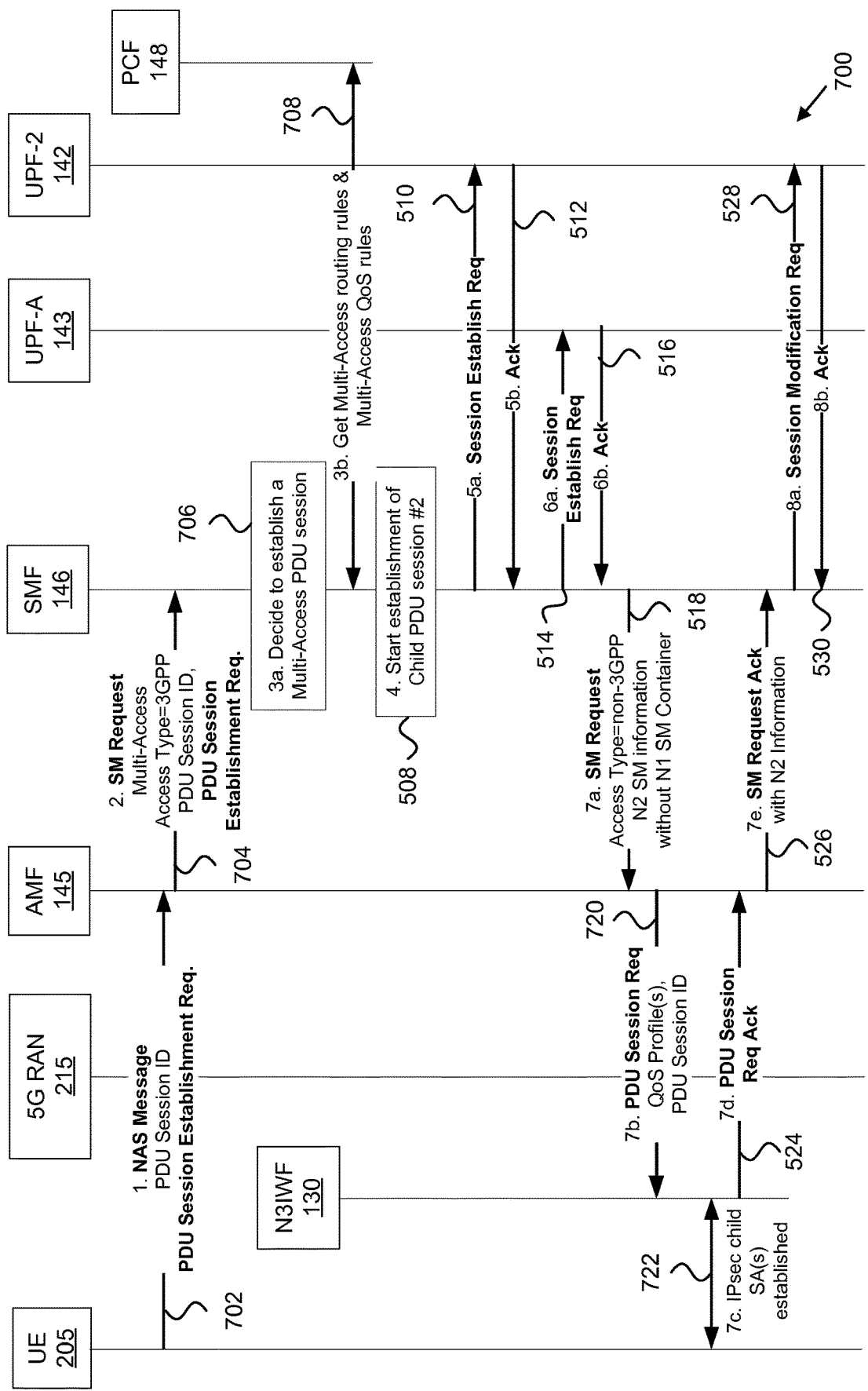
FIG. 7 is a block diagram illustrating one embodiment of a network procedure for establishing a multi-access data connection.

FIG. 7 depicts a network procedure 700 for establishing a multi-access data connection, according to embodiments of the disclosure. The network procedure 700 is a network-initiated procedure for establishing a multi-access data connection from a single request to establish a data connection. The network procedure involves the UE 205, the 5G RAN 215, the N3IWF 135, the AMF 145, the SMF 146, the first UPF 141, the second UPF 142, the anchor UPF 143, and the PCF 148. Here, the UE 205 is simultaneously connected to the mobile communication network via a 3GPP access network (here, the 5G RAN 215) and a non-3GPP access network (such as the WLAN 220).

The network procedure 700 begins and the UE 205 requests a normal (i.e. single-access network) PDU session (see operation 702). In the embodiments of FIG. 7, the NAS message is sent over the 5G RAN 215 (e.g., the 3GPP access network), but in other embodiments the NAS message may be sent over the non-3GPP access network. The NAS message includes a single PDU session identity, but does not contain any indication that the UE 205 wants to establish a multi-access PDU session. The NAS message sent by the UE 205 may also include other information, such as the requested DNN (Data Network Name), the requested slice type, etc.

Next, the AMF 145 selects an SMF 146 and sends the SM Request to the SMF 146 and includes the new Multi-access parameter to indicate to the SMF 146 that the UE 205 is connected both to 3GPP access network and to non-3GPP access network (704). The SM Request includes the "PDU Session Establishment Request" received from the UE 205. The SM Request further includes an Access Network Type parameter. Here, this parameter has the value "Access network Type=3GPP" to indicate to the SMF 146 that the PDU Session Establishment Request was received over 3GPP access network (e.g., the 5G RAN 215). Where the PDU Session Establishment Request is received over the non-3GPP access network, then a value "Access network Type=non-3GPP" is to be used.

Based on the Multi-access parameter and local information or policy, the SMF 146 decides to establish a MA-PDU session instead of the single-access network PDU session requested by the UE 205 (see operation 706). This decision may be made when the SMF 146 wants e.g. to offload some of the data traffic of the requested PDU session to non-3GPP access network. For example, when the UE 205 requests in operation 702 to establish a PDU session over 3GPP access network to the Internet DNN (Data Network Name), the SMF 146 may decide to establish a MA-PDU session to the Internet DNN so that some Internet traffic can be offloaded to non-3GPP access network.

Before taking this decision, the SMF 146 may interact with the UDM 149 to determine if the UE 205's subscription allows the establishment of an MA-PDU session to the requested DNN. In addition, the SMF 146 may decide to establish an MA-PDU session based on information retrieved from the PCF 148 in operation 708. In this case, the decision to establish a MA-PDU session (e.g., operation 706) is taken after operation 708.

As discussed, the SMF 146 interacts with the PCF 148 (e.g. establishes a new PDU-CAN session) and may retrieve multi-access routing rules that should be applied at the UE 205 and at the anchor UPF 143 in order to determine how to route uplink and downlink traffic respectively across the two child PDU sessions (see operation 708). The SMF 146 may also retrieve from PCF multi-access QoS rules, i.e. QoS rules that should be applied over 3GPP access network and QoS rules that should be applied over non-3GPP access network.

Next, the SMF 146 begins to establish the child PDU session #2 over non-3GPP access network, as discussed above in operations 508-518. The AMF 145 sends to the N3IWF 135 the QoS profile(s) to be applied over non-3GPP access network, each one determined from the QoS rules to be applied over non-3GPP access network, provided by PCF. Additionally, the N3IWF 135 receives the single PDU session ID that was provided by the UE 205 in step 1.

Next, the UE 205 and the N3IWF 135 establish one or more child IPsec SAs (see operation 722). Based on the received PDU Session ID the UE 205 determines that these child IPsec SAs are part of the PDU session requested in operation 702. In other words, the UE 205 determines that the network has decided to establish a MA-PDU session instead of the requested single-access network PDU session. The N3IWF 135 then sends a PDU Session Request Acknowledgment message to the AMF 145 (see operation 524) and the AMF 145 sends a SM Request Acknowledgment message to the SMF 146 (see operation 526). The SMF 146 also sends a Session Modification Request to the second UPF 142 (see operation 528) and receives an Acknowledgment message in response (see operation 530).

The network procedure 700 continues by establishing the user-plane for the child PDU session over 3GPP (e.g., the first child PDU session 225), which utilizes 3GPP access network as depicted in FIG. 6B and described above with reference to FIG. 6B. In sum, the SMF 146 sends an SM Request Acknowledgment message to the AMF 145 (e.g., operation 542), the AMF 145 sends a PDU Session Request to the 5G RAN 215 that includes the single PDU Session ID (operation 644), and the UE 205 and 5G RAN 215 establish DRBs (operation 646).

While the Figures show sequential establishment of the child PDU sessions, in other embodiments the two child PDU session are established in parallel. Also note that because a single PDU session identity is shared by the child PDU sessions, whenever the UE 205 or the network wants to perform an operation on a child PDU session (e.g. the change the QoS rules of the child PDU session #2), both the PDU session identity and the corresponding access network type are to be provided in order to identify the appropriate child PDU session.

FIG. 8 depicts a UE model 800, according to embodiments of the disclosure. The UE model 800 shows the UE 205 after the multi-access data connection (e.g., the MA-PDU session) is established. As depicted, the IP layer 201 generates an uplink data (UL data) packet which is passed to the virtual interface layer 203. As described above, the virtual interface layer 203 is a layer that exposes a single interface to the upper layers, e.g. a single IP interface to the IP layer 201 when the MA-PDU session is of IP type. The virtual interface layer 203 applies the multi-access routing rules 803 that were received during the establishment of the MA-PDU session and determines whether the UL data packet should be routed via the child PDU session over 3GPP access or via the child PDU session over non-3GPP access.

Each child PDU session has its own QoS rules (e.g., QoS rules for non-3GPP 805 and QoS rules for 3GPP 807), as shown in FIG. 8. The UL data packet routed to a child PDU session is first matched against a QoS rule and associated with the QoS Flow Identifier (QFI) of the matched QoS rule. Then, based on the associated QFI, it is routed to a corresponding DRB (for the 3GPP child PDU session) or to a corresponding child IPsec SA (for the non-3GPP PDU session).

Figure 9:
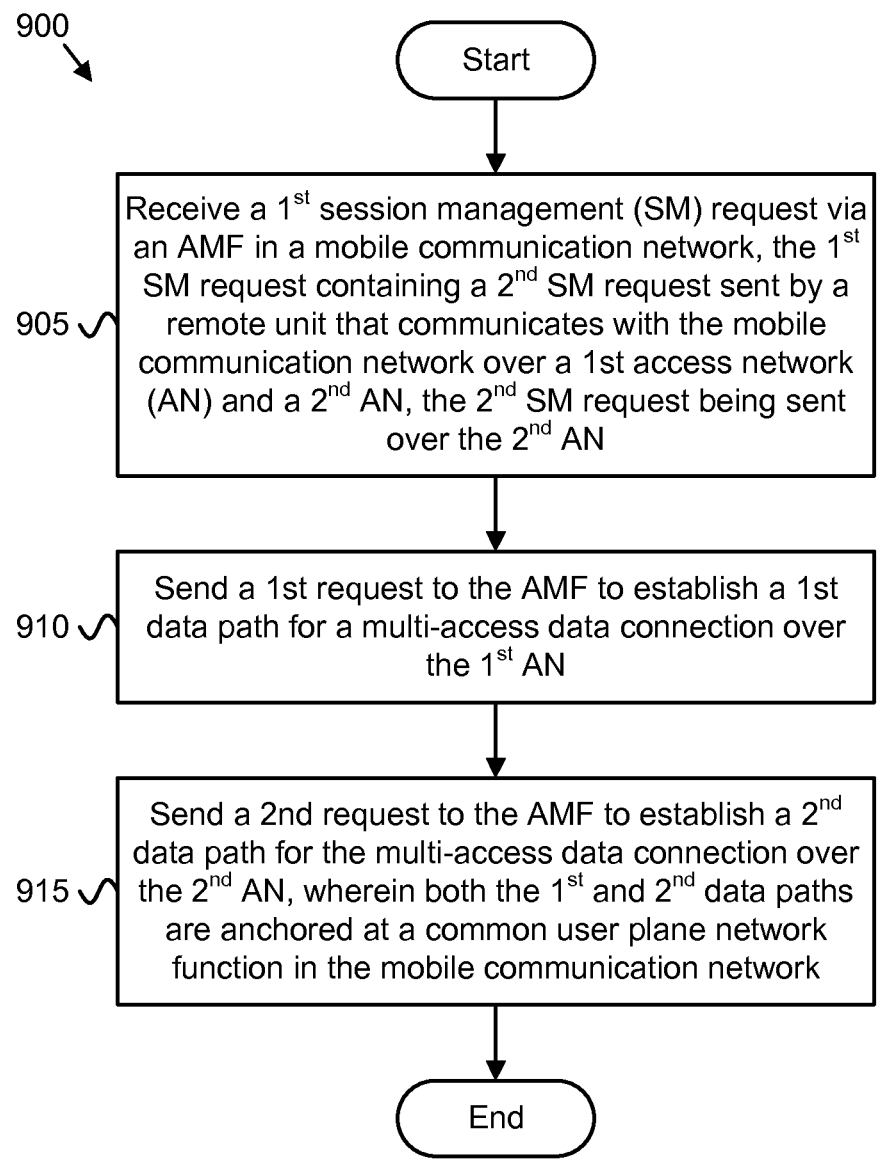
FIG. 9 is a schematic flow chart diagram illustrating one embodiment of a method for establishing a multi-access data connection.

FIG. 9 depicts a method 900 for establishing a multi-access data connection, according to embodiments of the disclosure. In some embodiments, the method 900 is performed by an apparatus, such as the SMF 146 and/or session management apparatus 400. In certain embodiments, the method 900 may be performed by a processor executing program code, for example, a microcontroller, a microprocessor, a CPU, a GPU, an auxiliary processing unit, a FPGA, or the like.

The method 900 begins with receiving 905 a first session management request via an access management function in a mobile communication network. Here, the first session management request containing a second session management request sent by a remote unit that communicates with the mobile communication network over a first access network and a second access network. In one embodiment, the second session management request is sent over the second access network.

In some embodiments, the first session management request contains an indication to establish a multi-access data connection for the remote unit over both a first access network and a second access network. In one embodiment, the indication to establish a multi-access data connection for the remote unit over both a first access network and a second access network contains a first session identifier associated with the first access network and a second session identifier associated with the second access network. In another embodiment, the indication to establish a multi-access data connection for the remote unit over both a first access network and a second access network contains a first session identifier and a multi-access parameter.

In some embodiments, the second session management request is a request from the remote unit to establish a data connection over a single access network, and the first session management request includes an indication that the remote unit has simultaneous connections to both the first access network and the second access network. In such embodiments, receiving 905 the first session management request may include comprising determining to establish a multi-access data connection in response to receiving the first session management request. In certain embodiments, the second session management request includes a mode parameter, the mode parameter containing a requested mode of operation for the multi-access data connection.

In certain embodiments, receiving 905 the first session management request includes querying a policy control function for at least one of: multi-access routing rules and multi-access QoS rules associated with the remote unit. Here, the multi-access QoS rules comprise QoS rules for the first access network and QoS rules for the second access network. The multi-access routing rules indicate how to route the traffic of the multi-access data connection across the first access network and the second access network.

In certain embodiments, the first access network is an access network not defined by 3GPP ("non-3GPP access") and the second access network is an access network defined by 3GPP ("3GPP access"). In such embodiments, the second session management request may be a Packet Data Unit ("PDU") session establishment request.

The method 900 includes sending 910 a first request to the access management function to establish a first data path for the multi-access data connection over the first access network, in response to the first session management request. In certain embodiments, sending 910 the first request to the access management function to establish the first data path for the multi-access data connection includes sending a third session management request without an embedded N1 Session Management container. Here, the third session management request indicates that the access management function is to send the first request to the first access network.

In some embodiments, sending 910 the first request to the access management function includes sending a session establishment request to the common user plane function anchoring the first and second data paths, the session establishment request including the multi-access routing rules and an indication that the first and second data paths are for a multi-access data connection.

In one embodiment, sending 910 the first request to the access management function includes querying a data management function to determine whether a network subscription of the remote unit allows a multi-access connection in response to receiving the first session management request and determining to establish a multi-access data connection based on the network subscription of the remote unit. In another embodiment, sending 910 a first request to the access management function includes querying a policy control function for at least one of multi-access routing rules and multi-access QoS rules associated with the requested data connection in response to receiving the first session management request, and determining to establish the multi-access data connection based on the at least one of multi-access routing rules and multi-access QoS rules received from the policy control function.

The method 900 includes sending 915 a second request to the access management function to establish a second data path for the multi-access data connection over the second access network, in response to the first session management request. Here, both the first data path and the second data path are anchored at a common user plane network function in the mobile communication network. In certain embodiments, sending 915 the second request to the access management function to establish the second data path for the multi-access data connection includes sending a response to the first session management request, wherein the response contains an embedded N1 Session Management container. In one embodiment, the embedded N1 Session Management container includes a PDU session establishment access message that contains multi-access routing rules and multi-access quality-of-service ("QoS") rules associated with the multi-access data connection. The method 900 ends.

Figure 10:
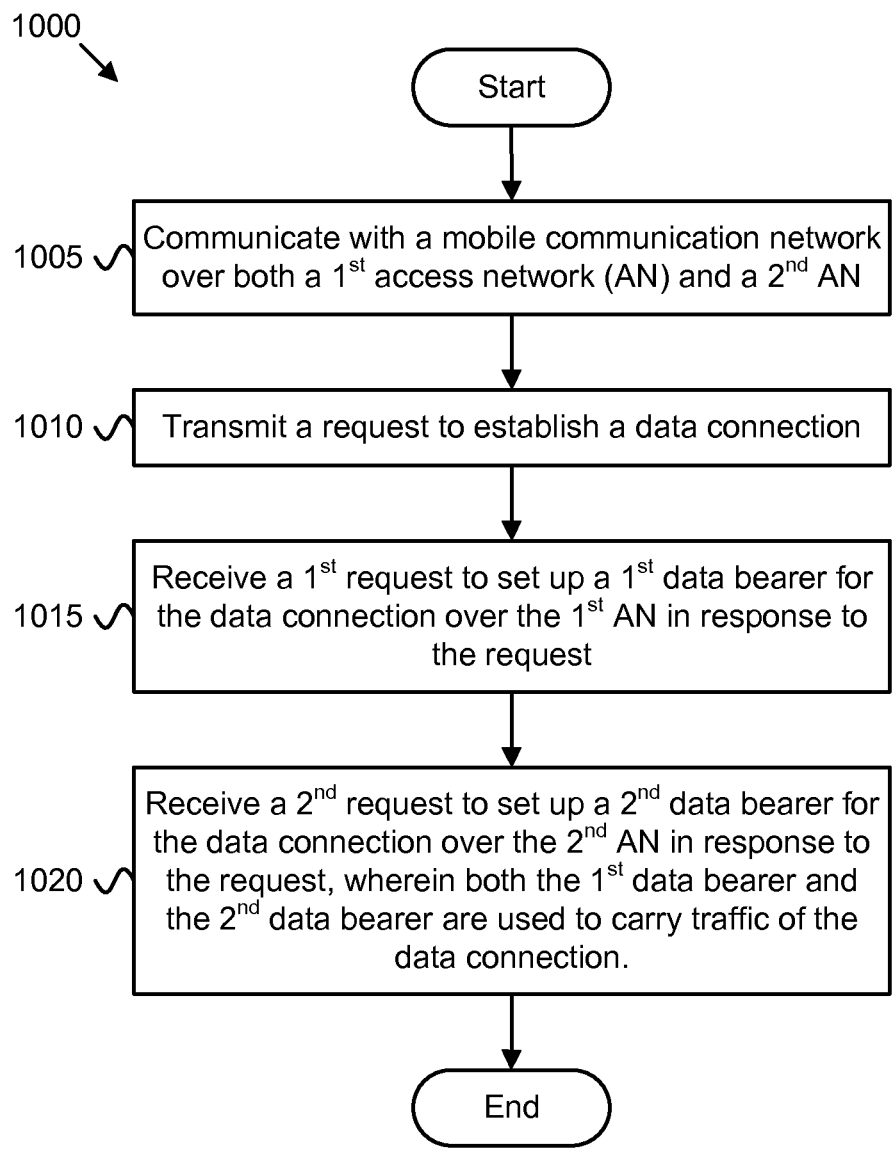
FIG. 10 is a schematic flow chart diagram illustrating another embodiment of a method for establishing a multi-access data connection.

FIG. 10 depicts a method 1000 for establishing a multi-access data connection, according to embodiments of the disclosure. In some embodiments, the method 1000 is performed by an apparatus, such as the remote unit 105, the UE 205, and/or the UE apparatus 300. In certain embodiments, the method 1000 may be performed by a processor executing program code, for example, a microcontroller, a microprocessor, a CPU, a GPU, an auxiliary processing unit, a FPGA, or the like.

The method 1000 begins with communicating 1005 with a mobile communication network over both a first access network and a second access network. The method 1000 includes transmitting 1010 a request to establish a data connection. In some embodiments, the first access network is an access network not defined by 3GPP ("non-3GPP access") and the second access network is an access network defined by 3GPP ("3GPP access"). In such embodiment, the request to establish a data connection may be a PDU session establishment request. In certain embodiments, the request to establish a data connection comprises a mode parameter, the mode parameter containing a requested mode of operation for a multi-access data connection.

In some embodiments, the request to establish a data connection includes an indication to establish the data connection over both the first and the second access networks. In one embodiment, the indication to establish the data connection over both the first and the second access networks comprises a first session identifier associated with the first access network and a second session identifier associated with the second access network. In another embodiment, the indication to establish the data connection over both the first and the second access networks comprises a first session identifier and a multi-access parameter, wherein the first session identifier is associated to both the first access network and the second access network.

In certain embodiments, transmitting 1010 the request to establish a data connection comprises transmitting over the second access network. In certain embodiments, the request to establish a data connection contains a session identifier associated with the second access network and does not contain a session identifier associated with the first access network.

The method 1000 includes receiving 1015 a first request to set up a first data bearer for the data connection over the first access network in response to the request. In certain embodiments, the first request to set up a first data bearer for the data connection over the first access network includes the session identifier associated with the second access network. In further embodiments, receiving 1015 the first request to set up a first data bearer may include determining that the request over the second access network to establish a data connection has initiated the establishment of a multi-access data connection over the first access network and the second access network, e.g., determined based on the first request including the session identifier associated with the second access network.

The method 1000 includes receiving 1020 a second request to set up a second data bearer for the data connection over the second access network in response to the request. Here, both the first data bearer and the second data bearer are used to carry traffic of the data connection. The method 1000 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a transceiver that communicates with one or more network functions in a mobile communication network; and
   a processor that:
   receives a first session management request via an access management function, the first session management request containing a second session management request sent by a remote unit that communicates with the mobile communication network over a first access network and a second access network, the second session management request being sent over the second access network;
   sends a first request to the access management function to establish a first data path for a multi-access data connection over the first access network, in response to the first session management request; and sends a second request to the access management function to establish a second data path for the multi-access data connection over the second access network, in response to the first session management request, wherein both the first data path and the second data path are anchored at a common user plane network function in the mobile communication network.

2. The apparatus of claim 1, wherein the first session management request contains an indication to establish a multi-access data connection for the remote unit over both a first access network and a second access network.

3. The apparatus of claim 2, wherein the indication to establish a multi-access data connection for the remote unit over both a first access network and a second access network contains a first session identifier associated with the first access network and a second session identifier associated with the second access network.

4. The apparatus of claim 2, wherein the indication to establish a multi-access data connection for the remote unit over both a first access network and a second access network contains a first session identifier and a multi-access parameter, wherein the first session identifier is associated to both the first access network and the second access network.

5. The apparatus of claim 1, wherein the processor further queries a policy control function for at least one of multi-access routing rules and multi-access quality-of-service ("QoS") rules associated with the remote unit.

6. The apparatus of claim 5, wherein the processor further sends a session establishment request to the common user plane function anchoring the first and second data paths, the session establishment request including the multi-access routing rules and an indication that the first and second data paths are for a multi-access data connection.

7. The apparatus of claim 1,
wherein the first access network is an access network not defined by 3GPP ("non-3GPP access") and the second access network is an access network defined by 3GPP ("3GPP access"), and
wherein the second session management request is a Packet Data Unit ("PDU") session establishment request.

8. The apparatus of claim 7,
wherein sending the first request to the access management function to establish the first data path for the multi-access data connection comprises sending a third session management request without an embedded N1 Session Management container, the third session management request indicating that the access management function is to send it to the first access network, and
wherein sending the second request to the access management function to establish the second data path for the multi-access data connection comprises sending a response to the first session management request, wherein the response contains an embedded N1 Session Management container.

9. The apparatus of claim 8, wherein the N1 Session Management container includes a PDU session establishment access message that contains multi-access routing rules and multi-access quality-of-service ("QoS") rules associated with the multi-access data connection.

10. The apparatus of claim 1, wherein the second session management request is a request from the remote unit to establish a data connection over a single access network, and the first session management request includes an indication that the remote unit has simultaneous connections to both the first access network and the second access network, wherein the processor further determines to establish a multi-access data connection in response to receiving the first session management request.

11. The apparatus of claim 10, wherein the processor further queries a data management function to determine whether a network subscription of the remote unit allows a multi-access connection in response to receiving the first session management request, and wherein the processor determines to establish a multi-access data connection based on the network subscription of the remote unit.

12. The apparatus of claim 10, wherein the processor further queries a policy control function for at least one of multi-access routing rules and multi-access quality-of-service ("QoS") rules associated with the requested data connection in response to receiving the first session management request, and wherein the processor determines to establish the multi-access data connection based on the at least one of multi-access routing rules and multi-access QoS rules received from the policy control function.

13. The apparatus of claim 1, wherein the second session management request comprises a mode parameter, the mode parameter containing a requested mode of operation for the multi-access data connection.

14. A method comprising:
receiving a first session management request via an access management function in a mobile communication network, the first session management request containing a second session management request sent by a remote unit that communicates with the mobile communication network over a first access network and a second access network, the second session management request being sent over the second access network;
sending a first request to the access management function to establish a first data path for a multi-access data connection over the first access network, in response to the first session management request; and
sending a second request to the access management function to establish a second data path for the multi-access data connection over the second access network, in response to the first session management request, wherein both the first data path and the second data path are anchored at a common user plane network function in the mobile communication network.

* * * * *